United States Patent
Aradi et al.

(10) Patent No.: US 7,553,343 B2
(45) Date of Patent: Jun. 30, 2009

(54) FUELS COMPOSITIONS FOR DIRECT INJECTION GASOLINE ENGINES CONTAINING MANGANESE COMPOUNDS

(75) Inventors: Allen A. Aradi, Richmond, VA (US); Joseph W. Roos, Glen Allen, VA (US); Herbert M. Scull, Mechanicsville, VA (US); Michael W. Meffert, Midlothian, VA (US)

(73) Assignee: Afton Chemical Intangibles, LLC, Richmond, VA (US)

( * ) Notice: Subject to any disclaimer, the term of this patent is extended or adjusted under 35 U.S.C. 154(b) by 1617 days.

(21) Appl. No.: 10/149,303

(22) PCT Filed: Dec. 12, 2000

(86) PCT No.: PCT/US00/33653

§ 371 (c)(1), (2), (4) Date: Jun. 10, 2002

(87) PCT Pub. No.: WO01/42398

PCT Pub. Date: Jun. 14, 2001

(65) Prior Publication Data

US 2003/0213165 A1    Nov. 20, 2003

(51) Int. Cl.
*C10L 1/18* (2006.01)

(52) U.S. Cl. .............................. 44/359; 44/347; 44/360; 44/415; 44/443

(58) Field of Classification Search .................. 44/347, 44/359, 360, 415, 443
See application file for complete search history.

(56) References Cited

U.S. PATENT DOCUMENTS

| | | | |
|---|---|---|---|
| 4,191,536 A | 3/1980 | Niebylski | |
| 5,089,028 A | 2/1992 | Abramo et al. | |
| 5,551,957 A | 9/1996 | Cunningham et al. | |
| 5,679,116 A | 10/1997 | Cunningham et al. | |
| 5,873,917 A | 2/1999 | Daly | |
| 5,944,858 A | 8/1999 | Wallace | |
| 5,997,593 A * | 12/1999 | McDonnell et al. | ........... 44/421 |
| 6,039,772 A | 3/2000 | Orr | |
| 6,048,373 A | 4/2000 | Malfer et al. | |

* cited by examiner

*Primary Examiner*—Cephia D Toomer
(74) *Attorney, Agent, or Firm*—Thomas, Raring & Teague, P.C.

(57) ABSTRACT

Deposits and soot formation in a direct injection gasoline engine are reduced by providing as fuel for the operation of said direct injection engine a fuel composition comprising a fuel-soluble cyclopentadienyl manganese tricarbonyl compound.

26 Claims, No Drawings

US 7,553,343 B2

FUELS COMPOSITIONS FOR DIRECT INJECTION GASOLINE ENGINES CONTAINING MANGANESE COMPOUNDS

FIELD OF THE INVENTION

The present invention relates to new spark-ignition fuel compositions and methods for controlling, i.e. reducing or eliminating, deposits and reducing soot formation in direct injection gasoline (DIG) engines. More particularly, the invention relates to fuel compositions comprising a spark-ignition fuel and a manganese compound and the use of said fuel compositions in DIG engines.

BACKGROUND OF THE INVENTION

Over the years considerable work has been devoted to additives for controlling (preventing or reducing) deposit formation in the fuel induction systems of spark-ignition internal combustion engines. In particular, additives that can effectively control fuel injector deposits, intake valve deposits and combustion chamber deposits represent the focal point of considerable research activities in the field and despite these efforts, further improvements are desired.

Direct injection gasoline (DIG) technology is currently on a steep developmental curve because of its high potential for improved fuel economy and power. Environmentally, the fuel economy benefits translate directly into lower carbon dioxide emissions, a greenhouse gas that is contributing to global warming.

Conventional multi-port injection (MPI) engines form a homogeneous pre-mixture of gasoline and air by injecting gasoline into the intake port, while a direct injection gasoline engine injects gasoline directly into the combustion chamber like a diesel engine so that it becomes possible to form a stratified fuel mixture which is rich in the neighborhood of the spark plug but highly lean in the entire combustion chamber. Due to the formation of such a stratified fuel mixture, combustion with the overall highly lean mixture can be achieved, leading to an improvement in fuel consumption approaching that of a diesel engine.

However, direct injection gasoline engines can encounter problems different from those of the conventional engines due to the direct injection of gasoline into the combustion chamber. One of these problems is related to the smoke exhausted mainly from the part of the mixture in which the gasoline is excessively rich, upon the stratified combustion. The amount of soot produced is greater than that of a conventional MPI engine, thus a greater amount of soot can enter the lubricating oil through combustion gas blow by.

There are a number of technical issues to be resolved with DIG technology, and one of them is injector performance with different gasoline fuels on the world market. Being located in the combustion chamber, DIG injectors are exposed to a much harsher environment than conventional engines with port fuel injectors (PFI). This more severe environment can accelerate fuel degradation and oxidation to form deposits.

DIG technology promises about a third less carbon dioxide emissions than comparable conventional multi-port injection. This is achieved with a 10-15% improvement in fuel consumption when operating in the homogeneous mode, and up to 35% when operating in the lean stratified mode. Fuel economy benefits also translate into fossil energy conservation and savings for the consumer. In addition, the DIG operation platform facilitates up to a 10% power increase for the same fuel burned in the equivalent MPI configuration.

Current generation DIG technologies have experienced deposit problems. Areas of concern are fuel rails, injectors, combustion chamber (CCD), crankcase soot loadings, and intake valves (IVD). Deposits in the intake manifold come in through the PCV valve and exhaust gas recirculation (EGR). Since there is no liquid fuel wetting the back of the intake valves, these deposits build up quite quickly.

Injector deposits in DIG engines restrict fuel flow and alter spray characteristics of the injectors. Low levels of fuel flow restriction can be compensated for by engine control electronics. However, high levels of flow restriction and any level of spray distortion cannot be adequately controlled electronically. In PFI engines, the cut-off point, as defined by the U.S. Environmental Protection Agency, for injector flow restriction is 5% for any one injector when tested in accordance with ASTM D 5598-94. This is because spray distortion is not much of an issue. In DIG engines, on the other hand, charge flow characteristics in the cylinder are critical to the calibrations that go into driveability, fuel economy, and emissions. In-cylinder charge motion in DIG engines is very sensitive to injector spray distortion. For this reason, DIG injector flow restriction cut-off point may be much lower than the 5% level assigned to PFI injector performance.

Fuel related deposits in direct injection gasoline (DIG) engines are an issue of current interest since this technology is now commercial in Japan and Europe. Fuel injector performance is at the forefront of this issue because the DIG combustion system relies heavily on fuel spray consistency to realize its advantages in fuel economy and power, and to minimize exhaust emissions. A consistent spray pattern enables more precise electronic control of the combustion event and the exhaust after-treatment system.

There are numerous references teaching fuel compositions containing manganese compounds, for example, U.S. Pat. Nos. 5,551,957; 5,679,116; and 5,944,858. However, none of these references teach the use of fuel compositions containing manganese compounds in direct injection gasoline engines or the impact manganese compounds have on deposits in these engines.

SUMMARY OF THE INVENTION

The present invention is directed to a fuel composition comprising (a) a spark-ignition internal combustion fuel; and (b) a cyclopentadienyl manganese tricarbonyl compound. Further, this invention is directed to methods of controlling deposits and reducing soot formation in direct injection gasoline engines.

DETAILED DESCRIPTION OF THE INVENTION

Cyclopentadienyl Manganese Tricarbonyl Compounds

Cyclopentadienyl manganese tricarbonyl compounds which can be used in the practice of this invention include cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and the like, including mixtures of two or more such compounds. Preferred are the cyclopentadienyl manganese tricarbonyls which are liquid at room temperature such as methylcyclopentadienylmanganesetricarbonyl, ethylcyclopentadienyl manganese tricarbonyl, liquid mixtures of cyclopentadienyl manganese tricarbonyl and methylcyclopentadienyl manganese tricarbonyl, mixtures of methylcyclopentadienyl manganese tricarbonyl and ethylcyclopentadienyl manganese tricarbonyl, etc. Preparation of such compounds is described in the literature, for example, U.S. Pat. No. 2,818,417, the disclosure of which is incorporated herein in its entirety.

When formulating the fuel compositions of this invention, the cyclopentadienyl manganese tricarbonyl compounds are employed in amounts sufficient to reduce or inhibit deposit and/or soot formation in a direct injection gasoline engine. Thus the fuels will contain minor amounts of the cyclopentadienyl manganese tricarbonyl compounds that control, eliminate or reduce, formation of engine deposits, especially injector deposits and/or control soot formation. Generally speaking the fuels of the invention will contain an amount of the cyclopentadienyl manganese tricarbonyl compound sufficient to provide from about 0.0078 to about 0.25 gram of manganese per gallon of fuel, and preferably from about 0.0156 to about 0.125 gram of manganese per gallon.

The fuel compositions of the present invention may contain supplemental additives in addition to the manganese compounds described above. Said supplemental additives include dispersants/detergents, antioxidants, carrier fluids, metal deactivators, dyes, markers, corrosion inhibitors, biocides, antistatic additives, drag reducing agents, demulsifiers, dehazers, anti-icing additives, antiknock additives, anti-valve-seat recession additives, lubricity additives and combustion improvers.

The fuel compositions of the present invention may, and typically do, contain amine detergents. Suitable amine detergents for use in the present invention include hydrocarbyl succinic anhydride derivatives, Mannich condensation products, hydrocarbyl amines and polyetheramines. When used, the amine detergents are typically present in an amount of from 5 to 100 pounds by weight of additive per thousand barrels by volume of fuel.

The hydrocarbyl-substituted succinic anhydride derivatives suitable for use in the present invention include hydrocarbyl succinimides, succinamides, succinimide-amides and succinimide-esters. The hydrocarbyl-substituted succinic anhydride derivatives are typically prepared by reacting a hydrocarbyl-substituted succinic acylating agent with a polyamine.

The hydrocarbyl-substituted succinic acylating agents include the hydrocarbyl-substituted succinic acids, the hydrocarbyl-substituted succinic anhydrides, the hydrocarbyl-substituted succinic acid halides (especially the acid fluorides and acid chlorides), and the esters of the hydrocarbyl-substituted succinic acids and lower alcohols (e.g., those containing up to 7 carbon atoms), that is, hydrocarbyl-substituted compounds which can function as carboxylic acylating agents. Of these compounds, the hydrocarbyl-substituted succinic acids and the hydrocarbyl-substituted succinic anhydrides and mixtures of such acids and anhydrides are generally preferred, the hydrocarbyl-substituted succinic anhydrides being particularly preferred.

The acylating agent for producing the detergent is preferably made by reacting a polyolefin of appropriate molecular weight (with or without chlorine) with maleic anhydride. However, similar carboxylic reactants can be employed such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters.

For example, hydrocarbyl-substituted succinic anhydrides may be prepared by the thermal reaction of a polyolefin and maleic anhydride, as described, for example in U.S. Pat. Nos. 3,361,673 and 3,676,089. Alternatively, the substituted succinic anhydrides can be prepared by the react on of chlorinated polyolefins with maleic anhydride, as described, for example, in U.S. Pat. No. 3,172,892. A further discussion of hydrocarbyl-substituted succinic anhydrides can be found, for example, in U.S. Pat. Nos. 4,234,435; 5,620,486 and 5,393,309.

The mole ratio of maleic anhydride to olefin can vary widely. It may vary, for example, from 5:1 to 1:5, a more preferred range is 3:1 to 1:3, preferably the maleic anhydride is used in stoichiometric excess, e.g. 1.1-5 moles maleic anhydride per mole of olefin. The unreacted maleic anhydride can be vaporized from the resultant reaction mixture.

Polyalkenyl succinic anhydrides may be converted to polyalkyl succinic anhydrides by using conventional reducing conditions such as catalytic hydrogenation. For catalytic hydrogenation, a preferred catalyst is palladium on carbon. Likewise, polyalkenyl succinimides may be converted to polyalkyl succinimides using similar reducing conditions.

The hydrocarbyl substituent on the succinic anhydrides employed in the invention is generally derived from polyolefins that are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, polyisobutene, and the polyalphaolefins produced from 1-octene and 1-decene.

A particularly preferred polyalkyl or polyalkenyl substituent is one derived from polyisobutene. Suitable polyisobutenes for use in preparing the succinimide-acids of the present invention include those polyisobutenes that comprise at least about 20% of the more reactive methylvinylidene isomer, preferably at least 50% and more preferably at least 70%. Suitable polyisobutenes include those prepared using $BF_3$ catalysts. The preparation of such polyisobutenes in which the methylvinylidene isomer comprises a high percentage of the total composition is described in U.S. Pat. Nos. 4,152,499 and 4,605,808.

Hydrocarbyl succinimides are obtained by reacting a hydrocarbyl-substitued succinic anhydride, acid, acid-ester or lower alkyl ester with an amine containing at least one primary amine group. Representative examples are given in U.S. Pat. Nos. 3,172,892; 3,202,678; 3,219,666; 3,272,746; 3,254,025, 3,216,936, 4,234,435; and 5,575,823. The alkenyl succinic anhydride may be prepared readily by heating a mixture of olefin and maleic anhydride to about 180-220° C. The olefin is preferably a polymer or copolymer of a lower monoolefin such as ethylene, propylene, isobutene and the like. The more preferred source of alkenyl group is from polyisobutene having a molecular weight up to 5000 or higher. In a still more, preferred embodiment the alkenyl is a polyisobutene group having a molecular weight of about 500-2000 and most preferably about 700-1500.

Amines which may be reacted with the alkenyl succinic anhydride to form the hydrocarbyl-succinimide include any that have at least one primary amine group that can react to form an imide group. A few representative examples are: methylamine, 2-ethylhexylamine, n-dodecylamine, stearylamine, N,N-dimethyl-propanediamine, N-(3-aminopropyl) morpholine, N-dodecyl propanediamine, N-aminopropyl piperazine ethanolamine, N-ethanol ethylene diamine and the like. Preferred amines include the alkylene polyamines such as propylene diamine, dipropylene triamine, di-(1,2butylene)-triamine, tetra-(1,2-propylene)pentaamine.

The most preferred amines are the ethylene polyamines which have the formula $H_2N(CH_2CH_2NH)_nH$ wherein n is an integer from one to ten. These ethylene polyamines include ethylene diamine, diethylene triamine, triethylene tetraamine, tetraethylene pentaamine, pentaethylene hexaamine, and the like, including mixtures thereof in which case n is the average value of the mixture. These ethylene polyamines have a primary amine group at each end so can form mono-alkenylsuccinimides and bis-alkenylsuccinimides. Thus especially preferred hydrocarbyl succinimides for use in the present invention are the products of reaction of a polyethylenepolyamine, e.g. triethylene tetramine or tetraethylene pentamine, with a hydrocarbon substituted carboxylic acid or anhydride made by reaction of a polyolefin, preferably polyisobutene, having a molecular weight of 500 to 2,000, especially 700 to 1500, with an unsaturated polycarboxylic acid or anhydride, e.g. maleic anhydride.

The Mannich base detergents of the present invention are the reaction products of an alkyl-substituted hydroxyaromatic compound, aldehydes and amines. The alkyl-substituted hydroxyaromatic compound, aldehydes and amines used in making the Mannich reaction products of the present invention may be any such compounds known and applied in the art, in accordance with the foregoing limitations.

Representative alkyl-substituted hydroxyaromatic compounds that may be used in forming the present Mannich base products are polypropylphenol (formed by alkylating phenol with polypropylene), polybutylphenols (formed by alkylating phenol with polybutenes and/or polyisobutylene), and polybutyl-co-polypropylphenols (formed by alkylating phenol with a copolymer of butylene and/or butylene and propylene). Other similar long-chain alkylphenols may also be used. Examples include phenols alkylated with copolymers of butylene and/or isobutylene and/or propylene, and one or more mono-olefinic comonomers copolymerizable therewith (e.g., ethylene, 1-pentene, 1-hexene, 1-octene, 1-decene, etc.) where the copolymer molecule contains at least 50% by weight, of butylene and/or isobutylene and/or propylene units. The comonomers polymerized with propylene or such butenes may be aliphatic and can also contain non-aliphatic groups, e.g., styrene, o-methylstyrene, p-methylstyrene, divinyl benzene and the like. Thus in any case the resulting polymers and copolymers used in forming the alkyl-substituted hydroxyaromatic compounds are substantially aliphatic hydrocarbon polymers.

Polybutylphenol (formed by alkylating phenol with polybutylene) is preferred. Unless otherwise specified herein, the term "polybutylene" is used in a generic sense to include polymers made from "pure" or "substantially pure" 1-butene or isobutene, and polymers made from mixtures of two or all three of 1-butene, 2-butene and isobutene. Commercial grades of such polymers may also contain insignificant amounts of other olefins. So-called high reactivity polyisobutenes having relatively high proportions of polymer molecules having a terminal vinylidene group are also suitable for use in forming the long chain alkylated phenol reactant. Suitable high-reactivity polyisobutenes include those polyisobutenes that comprise at least about 20% of the more reactive methylvinylidene isomer, preferably at least 50% and more preferably at least 70%. Suitable polyisobutenes include those prepared using $BF_3$ catalysts. The preparation of such polyisobutenes in which the methylvinylidene isomer comprises a high percentage of the total composition is described in U.S. Pat. Nos. 4,152,499 and 4,605,808.

The alkylation of the hydroxyaromatic compound is typically performed in the presence of an alkylating catalyst at a temperature in the range of about 0 to about 200° C., preferably 0 to 100° C. Acidic catalysts are generally used to promote Friedel-Crafts alkylation. Typical catalysts used in commercial production include sulphuric acid, $BF_3$, aluminum phenoxide, methanesulphonic acid, cationic exchange resin, acidic clays and modified zeolites.

The long chain alkyl substituents on the benzene ring of the phenolic compound are derived from polyolefin having a number average molecular weight ($M_n$) of from about 500 to about 3000, preferably from about 500 to about 2100, as determined by gel permeation chromatography (GPC). It is also preferred that the polyolefin used have a polydispersity (weight average molecular weight/number average molecular weight) in the range of about 1 to about 4 (preferably from about 1 to about 2) as determined by GPC.

The Mannich detergent may be made from a long chain alkylphenol. However, other phenolic compounds may be used including high molecular weight alkyl-substituted derivatives of cresol, resorcinol, hydroquinone, catechol, hydroxydiphenyl, benzylphenol, phenethylphenol, naphthol, tolylnaphthol, among others. Preferred for the preparation of the Mannich detergents are the polyalkylphenol and polyalkylcresol reactants, e.g., polypropylphenol, polybutylphenol, polypropylcresol and polybutylcresol, wherein the alkyl group has a number average molecular weight of about 500 to about 2100, while the most preferred alkyl group is a polybutyl group derived from polyisobutylene having a number average molecular weight in the range of about 800 to about 1300.

The preferred configuration of the alkyl-substituted hydroxyaromatic compound is that of a para-substituted mono-alkylphenol or a para-substituted mono-alkyl orthocresol. However, any alkylphenol readily reactive in the Mannich condensation reaction may be employed. Thus, Mannich products made from alkylphenols having only one ring alkyl substituent, or two or more ring alkyl substituents are suitable for use in this invention. The long chain alkyl substituents may contain some residual unsaturation, but in general, are substantially saturated alkyl groups.

Representative amine reactants include, but are not limited to, alkylene polyamines having at least one suitably reactive primary or secondary amino group in the molecule. Other substituents such as hydroxyl, cyano, amido, etc., can be present in the polyamine. In a preferred embodiment, the alkylene polyamine is a polyethylene polyamine. Suitable alkylene polyamine reactants include ethylenediamine, diethylenetriamine, triethylenetetramine, tetraethylenepentamine and mixtures of such amines having nitrogen contents corresponding to alkylene polyamines of the formula $H_2N-(A-NH-)_nH$, where A is divalent ethylene or propylene and n is an integer of from 1 to 10, preferably 1 to 4. The alkylene polyamines may be obtained by the reaction of ammonia and dihalo alkanes, such as dichloro alkanes.

In another preferred embodiment of the present invention, the amine is an aliphatic diamine having one primary or secondary amino group and at least one tertiary amino group in the molecule. Examples of suitable polyamines include N,N,N",N"-tetraalkyldialkylenetriamines (two terminal tertiary amino groups and one central secondary amino group), N,N,N',N"-tetraalkyltrialkylenetetramines (one terminal tertiary amino group, two internal tertiary amino groups and one terminal primary amino group), N,N,N',N",N'"-pentaalkyltrialkylenetetramines (one terminal tertiary amino group, two internal tertiary amino groups and one terminal secondary amino group), N,N-dihydroxyalkyl-alpha, omega-alkylenediamines (one terminal tertiary amino group and one terminal primary amino group), N,N,N'-trihydroxyalkyl-alpha, omega-alkylenediamines (one terminal tertiary amino group and one terminal secondary amino group), tris(dialkylaminoalkyl)aminoalkylmethanes (three terminal tertiary amino groups and one terminal primary amino group), and similar compounds, wherein the alkyl groups are the same or different and typically contain no more than about 12 carbon atoms each, and which preferably contain from 1 to 4 carbon atoms each. Most preferably these alkyl groups are methyl and/or ethyl groups. Preferred polyamine reactants are N,N-dialkyl-alpha, omega-alkylenediamine, such as those having from 3 to about 6 carbon atoms in the alkylene group and from 1 to about 12 carbon atoms in each of the alkyl groups, which most preferably are the same but which can be different. Most preferred is N,N-dimethyl-1,3-propanediamine and N-methyl piperazine.

Examples of polyamines having one reactive primary or secondary amino group that can participate in the Mannich condensation reaction, and at least one sterically hindered amino group that cannot participate directly in the Mannich condensation reaction to any appreciable extent include N-(tert-butyl)-1,3-propanediamine, N-neopentyl-1,3-propanediamine, N-(tert-butyl)-1-methyl-1,2-ethanediamine, N-(tert-butyl)-1-methyl-1,3-propanediamine, and 3,5-di (tert-butyl)aminoethylpiperazine.

Representative aldehydes for use in the preparation of the Mannich base products include the aliphatic aldehydes such as formaldehyde, acetaldehyde, propionaldehyde, butyraldehyde, valeraldehyde, caproaldehyde, heptaldehyde, stearaldehyde. Aromatic aldehydes which may be used include benzaldehyde and salicylaldehyde. Illustrative heterocyclic aldehydes for use herein are furfural and thiophene aldehyde, etc. Also useful are formaldehyde-producing reagents such as paraformaldehyde, or aqueous formaldehyde solutions such as formalin. Most preferred is formaldehyde or formalin.

The condensation reaction among the alkylphenol, the specified amine(s) and the aldehyde may be conducted at a temperature typically in the range of about 40° to about 200° C. The reaction can be conducted in bulk (no diluent or solvent) or in a solvent or diluent. Water is evolved and can be removed by azeotropic distillation during the course of the reaction. Typically, the Mannich reaction products are formed by reacting the alkyl-substituted hydroxyaromatic compound, the amine and aldehyde in the molar ratio of 1.0:0.5-2.0:1.0-3.0, respectively.

Suitable Mannich base detergents for use in the present invention include those detergents taught in U.S. Pat. Nos. 4,231,759; 5,514,190; 5,634,951; 5,697,988; 5,725,612; and 5,876,468, the disclosures of which are incorporated herein by reference.

Hydrocarbyl amine detergents are known materials prepared by known process technology. One common process involves halogenation of a long chain aliphatic hydrocarbon such as a polymer of ethylene, propylene, butylene, isobutene, or copolymers such as ethylene and propylene, butylene and isobutylene, and the like, followed by reaction of the resultant halogenated hydrocarbon with a polyamine. If desired, at least some of the product can be converted into an amine salt by treatment with an appropriate quantity of an acid. The products formed by the halogenation route often contain a small amount of residual halogen such as chlorine.

Another way of producing suitable aliphatic polyamines involves controlled oxidation (e.g., with air or a peroxide) of a polyolefin such as polyisobutene followed by reaction of the oxidized polyolefin with a polyamine. For synthesis details for preparing such aliphatic polyamine detergent/dispersants, see for example U.S. Pat. Nos. 3,438,757; 3,454,555; 3,485, 601; 3,565,804; 3,573,010; 3,574,576; 3,671,511; 3,746,520; 3,756,793; 3,844,958; 3,852,258; 3,864,098; 3,876,704; 3,884,647; 3,898,056; 3,950,426; 3,960,515; 4,022,589; 4,039,300; 4,128,403; 4,166,726; 4,168,242; 5,034,471; 5,086,115; 5,112,364; and 5,124,484; and published European Patent Application 384,086. The disclosures of each of the foregoing documents are incorporated herein by reference. The long chain substituent(s) of the hydrocarbyl amine detergent most preferably contain(s) an average of 50 to 350 carbon atoms in the form of alkyl or alkenyl groups (with or without a small residual amount of halogen substitution). Alkenyl substituents derived from poly-alpha-olefin homopolymers or copolymers of appropriate molecular weight (e.g., propene homopolymers, butene homopolymers, $C_3$ and $C_4$ alpha-olefin copolymers, and the like) are suitable. Most preferably, the substituent is a polyisobutenyl group formed from polyisobutene having a number average molecular weight (as determined by gel permeation chromatography) in the range of 500 to 2000, preferably 600 to 1800, most preferably 700 to 1600.

Polyetheramines suitable for use as the detergents of the present invention are "single molecule" additives, incorporating both amine and polyether functionalities within the same molecule. The polyether backbone can be based on propylene oxide, ethylene oxide, butylene oxide, or mixtures of these. The most preferred are propylene oxide or butylene oxide or mixture thereof to impart good fuel solubility. The polyetheramines can be monoamines, diamines or triamines. Examples of commercially available polyetheramines are those under the tradename Jeffamines™ available from Huntsman Chemical company. The molecular weight of the polyetheramines will typically range from 500 to 3000. Other suitable polyetheramines are those compounds taught in U.S. Pat. Nos. 4,288,612; 5,089,029; and 5,112,364.

When formulating the fuel compositions of this invention, the manganese compound (with our without other additives) is employed in amounts sufficient to reduce or eliminate deposits including injector deposits and/or control soot formation. Thus the fuels will contain minor amounts of the manganese compound proportioned so as to prevent or reduce formation of engine deposits, especially fuel injector deposits. Generally speaking the fuel compositions of this invention will contain an amount of manganese compound sufficient to provide from about 0.0078 to about 0.25 gram of manganese per gallon of fuel, and preferably from about 0.0156 to about 0.125 gram of manganese per gallon.

The base fuels used in formulating the fuel compositions of the present invention include any base fuels suitable for use in the operation of direct injection gasoline engines such as leaded or unleaded motor gasolines, and so-called reformulated gasolines which typically contain both hydrocarbons of the gasoline boiling range and fuel-soluble oxygenated blending agents ("oxygenates"), such as alcohols, ethers and other suitable oxygen-containing organic compounds. Preferably, the fuel is a mixture of hydrocarbons boiling in the gasoline boiling range. This fuel may consist of straight chain or branch chain paraffins, cycloparaffins, olefins, aromatic hydrocarbons or any mixture of these. The gasoline can be derived from straight run naptha, polymer gasoline, natural gasoline or from catalytically reformed stocks boiling in the range from about 80° to about 450° F. The octane level of the gasoline is not critical and any conventional gasoline may be employed in the practice of this invention.

Oxygenates suitable for use in the present invention include methanol, ethanol, isopropanol, t-butanol, mixed C1 to C5 alcohols, methyl tertiary butyl ether, tertiary amyl methyl ether, ethyl tertiary butyl ether and mixed ethers. Oxygenates, when used, will normally be present in the base fuel in an amount below about 30% by volume, and preferably in an amount that provides an oxygen content in the overall fuel in the range of about 0.5 to about 5 percent by volume.

In a preferred embodiment, the detergents are preferably used with a liquid carrier or induction aid. Such carriers can be of various types, such as for example liquid poly-α-olefin oligomers, mineral oils, liquid poly(oxyalkylene) compounds, liquid alcohols or polyols, polyalkenes, liquid esters, and similar liquid carriers. Mixtures of two or more such carriers can be employed.

Preferred liquid carriers include 1) a mineral oil or a blend of mineral oils that have a viscosity index of less than about 120, 2) one or more poly-α-olefin oligomers, 3) one or more poly(oxyalkylene) compounds having an average molecular weight in the range of about 500 to about 3000, 4) polyalkenes, 5) polyalkyl-substituted hydroxyaromatic compounds or 6) mixtures thereof. The mineral oil carrier fluids that can be used include paraffinic, naphthenic and asphaltic oils, and can be derived from various petroleum crude oils and processed in any suitable manner. For example, the mineral oils may be solvent extracted or hydrotreated oils. Reclaimed mineral oils can also be used. Hydrotreated oils are the most preferred. Preferably the mineral oil used has a viscosity at 40° C. of less than about 1600 SUS, and more preferably between about 300 and 1500 SUS at 40° C. Paraffinic mineral oils most preferably have viscosities at 40° C. in the range of about 475 SUS to about 700 SUS. For best results, it is highly desirable that the mineral oil have a viscosity index of less than about 100, more preferably, less than about 70 and most preferably in the range of from about 30 to about 60.

The poly-α-olefins (PAO) suitable for use as carrier fluids are the hydrotreated and unhydrotreated poly-α-olefin oligomers, i.e., hydrogenated or unhydrogenated products, primarily trimers, tetramers and pentamers of α-olefin monomers, which monomers contain from 6 to 12, generally 8 to 12 and most preferably about 10 carbon atoms. Their synthesis is outlined in *Hydrocarbon Processing*, February 1982, page 75 et seq., and in U.S. Pat. Nos. 3,763,244; 3,780,128; 4,172,855; 4,218,330; and 4,950,822. The usual process essentially comprises catalytic oligomerization of short chain linear alpha olefins (suitably obtained by catalytic treatment of ethylene). The poly-α-olefins used as carriers will usually have a viscosity (measured at 100° C.) in the range of 2 to 20 centistokes (cSt). Preferably, the poly-α-olefin has a viscosity of at least 8 cSt, and most preferably about 10 cSt at 100° C.

The poly (oxyalkylene) compounds which are among the preferred carrier fluids for use in this invention are fuel-soluble compounds which can be represented by the following formula

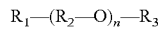

wherein $R_1$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, $R_2$ is an alkylene group having 2-10 carbon atoms (preferably 2-4 carbon atoms), $R_3$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, and n is an integer from 1 to 500 and preferably in the range of from 3 to 120 representing the number (usually an average number) of repeating alkyleneoxy groups. In compounds having multiple —$R_2$—O— groups, $R_2$ can be the same or different alkylene group and where different, can be arranged randomly or in blocks. Preferred poly (oxyalkylene) compounds are monools comprised of repeating units formed by reacting an alcohol with one or more alkylene oxides, preferably one alkylene oxide, more preferably propylene oxide or butylene oxide.

The average molecular weight of the poly (oxyalkylene) compounds used as carrier fluids is preferably in the range of from about 500 to about 3000, more preferably from about 750 to about 2500, and most preferably from above about 1000 to about 2000.

One useful sub-group of poly (oxyalkylene) compounds is comprised of the hydrocarbyl-terminated poly(oxyalkylene) monools such as are referred to in the passage at column 6, line 20 to column 7 line 14 of U.S. Pat. No. 4,877,416 and references cited in that passage, said passage and said references being fully incorporated herein by reference.

A preferred sub-group of poly (oxyalkylene) compounds is comprised of one or a mixture of alkylpoly (oxyalkylene) monools which in its undiluted state is a gasoline-soluble liquid having a viscosity of at least about 70 centistokes (cSt) at 40° C. and at least about 13 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly (oxyalkylene) carriers used in the practice of this invention preferably have viscosities in their undiluted state of at least about 60 cSt at 40° C. (more preferably at least about 70 cSt at 40° C.) and at least about 11 cSt at 100° C. (more preferably at least about 13 cSt at 100° C.). In addition, the poly (oxyalkylene) compounds used in the practice of this invention preferably have viscosities in their undiluted state of no more than about 400 cSt at 40° C. and no more than about 50 cSt at 100° C. More preferably, their viscosities will not exceed about 300 cSt at 40° C. and will not exceed about 40 cSt at 100° C.

Preferred poly (oxyalkylene) compounds also include poly (oxyalkylene) glycol compounds and monoether derivatives thereof that satisfy the above viscosity requirements and that are comprised of repeating units formed by reacting an alcohol or polyalcohol with an alkylene oxide, such as propylene oxide and/or butylene oxide with or without use of ethylene oxide, and especially products in which at least 80 mole % of the oxyalkylene groups in the molecule are derived from 1,2-propylene oxide. Details concerning preparation of such poly(oxyalkylene) compounds are referred to, for example, in Kirk-Othmer, *Encyclopedia of Chemical Technology*, Third Edition, Volume 18, pages 633-645 (Copyright 1982 by John Wiley & Sons), and in references cited therein, the foregoing excerpt of the Kirk-Othmer encyclopedia and the references cited therein being incorporated herein in toto by reference. U.S. Pat. Nos. 2,425,755; 2,425,845; 2,448,664; and 2,457,139 also describe such procedures, and are fully incorporated herein by reference.

The poly (oxyalkylene) compounds, when used, pursuant to this invention will contain a sufficient number of branched oxyalkylene units (e.g., methyldimethyleneoxy units and/or ethyldimethyleneoxy units) to render the poly (oxyalkylene) compound gasoline soluble.

Suitable poly (oxyalkylene) compounds for use in the present invention include those taught in U.S. Pat. Nos. 5,514,190; 5,634,951; 5,697,988; 5,725,612; 5,814,111 and 5,873,917, the disclosures of which are incorporated herein by reference.

The polyalkenes suitable for use as carrier fluids in the present invention include polypropene and polybutene. The polyalkenes of the present invention preferably have a molecular weight distribution (Mw/Mn) of less than 4. In a preferred embodiment, the polyalkenes have a MWD of 1.4 or below. Preferred polybutenes have a number average molecular weight (Mn) of from about 500 to about 2000, preferably 600 to about 1000, as determined by gel permeation chromatography (GPC). Suitable polyalkenes for use in the present invention are taught in co-pending U.S. application Ser. No. 09/201,113 filed Nov. 30, 1998.

The polyalkyl-substituted hydroxyaromatic compounds suitable for use as carrier fluid in the present invention include those compounds known in the art as taught in U.S. Pat. Nos. 3,849,085; 4,231,759; 4,238,628; 5,300,701; 5,755,835 and 5,873,917, the disclosures of which are incorporated herein by reference.

When the carrier fluids are used in combination with the amine detergents, the ratio (wt/wt) of detergent to carrier fluid(s) is typically in the range of from 1:0.1 to 1:3.

The additives used in formulating the preferred fuels of the present invention can be blended into the base fuel individually or in various sub-combinations. However, it is preferable to blend all of the components concurrently using an additive concentrate as this takes advantage of the mutual compatibility afforded by the combination of ingredients when in the form of an additive concentrate. Also use of a concentrate reduces blending time and lessens the possibility of blending errors.

A preferred embodiment of the present invention comprises a method for controlling injector deposits in a direct injection gasoline engine which comprises introducing into a direct injection gasoline engine with the combustion intake charge a spark-ignition fuel composition comprising a) a spark-ignition fuel and b) a fuel-soluble cyclopentadienyl manganese tricarbonyl compound.

Another preferred embodiment of the present invention comprises a method for reducing soot loading in the crankcase lubricating oil of a vehicle having a direct injection gasoline engine which comprises introducing into a direct injection gasoline engine with the combustion intake charge a spark-ignition fuel composition comprising a) a spark-ignition fuel and b) a fuel-soluble cyclopentadienyl manganese tricarbonyl compound.

EXAMPLES

The practice and advantages of this invention are demonstrated by the following examples which are presented for purposes of illustration and not limitation.

The manganese compound used in the following examples was methylcyclopentadienyl manganese tricarbonyl (MMT).

The Mannich detergents used in the following examples were derived by reaction of a long chain alkylated phenol ("PBP"), N,N-dimethyl-1,3-propanediamine ("DMPD"), and formaldehyde ("FA"). The PBP was formed by reacting phenol with a polyisobutylene having an alkylvinylidene isomer content of less than 10% and a number average molecular weight of about 900.

To demonstrate the effectiveness of the additive systems of the present invention in reducing deposits in direct injection gasoline engines, tests were conducted in a 1982 Nissan Z22e (2.2 liter) dual-sparkplug, four-cylinder engine modified to run in a homogeneous direct injection mode, at a fuel rich lambda of 0.8 to accelerate injector deposit formation. Details of this test are set forth in Aradi, A. A., Imoehl, B., Avery, N. L., Wells, P. P., and Grosser, R. W.: "*The Effect of Fuel Composition and Engine Operating Parameters on Injector Deposits in a High-Pressure Direct Injection Gasoline (DIG) Research Engine*", SAE Technical Paper 1999-01-3690 (1999).

Modifications to the engine included replacing the exhaust-side spark plugs with pre-production high-pressure common rail direct injectors, removing the OEM spark and fuel system, and installing a high-pressure fuel system and universal engine controller. Table 1 summarizes the specifications of the modified test engine. For homogeneous combustion, flat-top pistons and the conventional gasoline spark ignition combustion chamber design were found to be sufficient for this type of research work. The injectors were located on the hot (i.e. exhaust) side of the engine to favor high tip temperatures to promote injector deposit.

The rate of injector deposit formation was evaluated through the use of this specially developed steady-state engine test. Engine operating conditions for each test point were determined by mapping injector tip temperatures throughout the engine operating map range. The injectors were modified with thermocouples at the tip. Key parameters were inlet air and fuel temperatures, engine speed, and engine load. The inlet air and fuel temperatures were subsequently controlled at 35° C. and 32° C., respectively.

TABLE 1

Test Engine Specifications

| | |
|---|---|
| Type | Four Cylinder In-Line 2.2 L Nissan Engine Converted for DI Operation |
| Displacement | 2187 cubic centimeters |
| Plugs/cylinder | 1 (stock configuration: 2) |
| Valves/cylinder | 2 |
| Bore | 87 millimeters |
| Stroke | 92 millimeters |
| Fuel System | Common Rail High Pressure Direct Injection |
| Fuel Pressure | 6900 kPa (closed loop) |
| Engine Controller | Universal Laboratory System |
| Injection Timing | 300 degrees BTDC |
| Coolant Temperature (° C.) | 85 |
| Oil Temperature (° C.) | 95 |

At constant inlet air/fuel temperature and engine load, tip temperature remained constant at engine speeds of 1500, 2000, 2500, and 3000 rpm. However, at constant engine speed, tip temperatures increase with load. For five load points, 200, 300, 400, 500, and 600 mg/stroke air charge, increasing tip temperatures of 120, 140, 157, 173, and 184° C., respectively, were observed for each load.

Through previous research, it was determined that a tip temperature of 173° C. provided optimum conditions for injector deposit formation in this engine. Table 2 sets forth the key test conditions used in performing the evaluation of the additives of the present invention.

TABLE 2

Key Test Conditions

| | |
|---|---|
| Engine Speed (rpm) | 2500 |
| Inlet Air Temp. (° C.) | 35 |
| Inlet Fuel Temp. (° C.) | 32 |
| Exit Coolant Temp. (° C.) | 85 |

TABLE 2-continued

Key Test Conditions

| | |
|---|---|
| Exit Oil Temp. (° C.) | 95 |
| Load (mg air/stroke) | 500 |
| Injector Tip Temp. (° C.) | 173 |

The test was divided into three periods: engine warm-up, an operator-assisted period, and test period. Engine speed was controlled using the engine dynamometer controller, and the engine throttle was manipulated to control air charge using a standard automotive airflow meter as feedback in a closed-loop control system. Engine fueling was controlled in two ways. During warm-up, injector pulse width was controlled using a standard mass airflow strategy and exhaust gas sensor controlling the air/fuel mixture to stoichiometric. During the operator interaction period, the pulse width was manually set for each injector using wide-range lambda sensors in the exhaust port of each cylinder. Fuel flow was measured using a volumetric flow meter and a temperature-corrected density value was used to calculate mass flow.

Each fuel was run at a load condition of 500 mg/stroke. Injector deposit formation was followed by measuring total engine fuel flow at fixed speed, air charge (mass of air per intake stroke), and the lambda signal from each cylinder over a test period of six hours.

To help minimize injector-to-injector variability the same set of injectors was used for all tests at a particular engine load, with each injector always in the same cylinder.

Gasoline fuel compositions were subjected to the above-described engine tests whereby the substantial effectiveness of these compositions in minimizing injector deposit formation was conclusively demonstrated. The fuel used for these tests was a Howell EEE fuel having a $T_{90}$ (° C.) of 160, an olefin content of 1.2% and a sulfur content of 20 ppm. The detergent additives used and the percent flow loss for the fuels at tip temperatures of 173° C. are set forth in Table 3.

TABLE 3

Percent flow loss

| Sample # | MMT (g Mn/gallon) | Detergent (ptb) | Flow loss (%) |
|---|---|---|---|
| 1* | None | — | 10.24 |
| 2 | 1/64 | — | 5.37 |
| 3 | 1/32 | — | 6.26 |
| 4* | None | Mannich[1] (60) | 4.33 |
| 5 | 1/64 | Mannich[1] (60) | 4.16 |
| 6 | 1/32 | Mannich[1] (60) | 2.91 |

*Comparative Examples
[1]The detergent used in Examples 4–6 was a commercially-available Mannich detergent/carrier fluid mixture.

It is clear from examination of Table 3 that the addition of manganese compounds to fuels for use in direct injection gasoline engines provides unexpected improvements (reductions) in injector deposits when added to the base fuel as well as improving the effectiveness of a detergent in reducing injector deposits.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as a Mannich condensation reaction) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations is thus wholly immaterial for an accurate understanding and appreciation of this disclosure and the claims thereof.

As used herein the term "fuel-soluble" or "gasoline-soluble" means that the substance under discussion should be sufficiently soluble at 20° C. in the base fuel selected for use to reach at least the minimum concentration required to enable the substance to serve its intended function. Preferably, the substance will have a substantially greater solubility in the base fuel than this. However, the substance need not dissolve in the base fuel in all proportions.

At numerous places throughout this specification, reference has been made to a number of U.S. Patents and published foreign patent applications. All such cited documents are expressly incorporated in full into this disclosure as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

We claim:

1. A method for controlling injector deposits in a direct injection gasoline engine which comprises introducing into a direct injection engine with the combustion intake charge a spark-ignition fuel composition comprising a) a spark-ignition fuel and b) a fuel-soluble cyciopentadienyl manganese tricarbonyl compound.

2. The method of claim 1 wherein the spark-ignition fuel composition comprises the fuel-soluble cyclopentadienyl manganese tricarbonyl compound in proportions effective to reduce the volume of injector deposits in a direct injection gasoline engine operated on a spark-ignition fuel containing an injector deposit-controlling amount of said fuel-soluble cyclopentadienyl manganese tricarbonyl compound to below the volume of injector deposits in said direct injection gasoline engine operated in the same manner on the same spark-ignition fuel except that it is devoid of a fuel-soluble cyclopentadienyl manganese tricarbonyl compound.

3. The method of claim 1 wherein the spark-ignition fuel comprises gasoline.

4. The method of claim 1 wherein the spark-ignition fuel comprises a blend of hydrocarbons of the gasoline boiling range and a fuel-soluble oxygenated compound.

5. The method of claim 1 wherein said cyclopentadienyl manganese tricarbonyl compound comprises at least one member selected from the group consisting of cyclopentadienyl manganese tricarbonyl, methylcyclopentadienyl manganese tricarbonyl and mixtures thereof.

6. The method of claim 1 wherein the fuel-soluble cyclopentadienyl manganese tricarbonyl compound is present in an amount sufficient to provide 0.0078 to 0.25 gram of manganese per gallon of fuel.

7. The method of claim 6 wherein the fuel-soluble cyclopentadienyl manganese tricarbonyl compound is present in an amount sufficient to provide 0.0156 to 0.125 gram of manganese per gallon of fuel.

8. The method of claim 1 wherein the fuel composition further comprises at least one amine detergent.

9. The method of claim 8 wherein the amine detergent comprises at least one member selected from the group consisting of hydrocarbyl-substituted succinic anhydride derivatives, Mannich condensation products, hydrocarbyl amines and polyetheramines.

10. The method of claim 9 wherein the hydrocarbyl-substituted succinic anhydride derivatives comprise at least one member selected from the group consisting of hydrocarbyl succinimides, hydrocarbyl succinamides, hydrocarbyl succinimide-amides and hydrocarbyl succinimide-esters.

11. The method of claim 1 wherein the fuel composition further comprises a carrier fluid selected from the group consisting of 1) a mineral oil or a blend of mineral oils that have a viscosity index of less than about 120, 2) one or more poly-oo-olefin oligomers, (3) one or more poly (oxyalkylene) compounds having an average molecular weight in the range of about 500 to about 3,000, 4) one or more polyalkenes, 5) one or more polyalkyl-substituted hydroxyaromatic compounds and 6) mixtures thereof.

12. The method of claim 11 wherein the carrier fluid comprises at least one poly (oxyalkylene) compound.

13. The method of claim 1 wherein the fuel composition further comprises at least one additive selected from the group consisting of antioxidants, carrier fluids, metal deactivators, dyes, markers, corrosion inhibitors, biocides, antistatic additives, drag reducing agents, demulsifiers, dehazers, anti-icing additives, antiknock additives, anti-valve-seat recession additives, lubricity additives and combustion improvers.

14. A method for reducing soot loading in the crankcase lubricating oil of a vehicle having a direct injection gasoline engine which comprises introducing into a direct injection gasoline engine with the combustion intake charge a spark-ignition fuel composition comprising a) a spark-ignition fuel and b) a fuel-soluble cyclopentadienyl manganese tricarbonyl compound.

15. The method of claim 14 wherein the spark-ignition fuel composition comprises the fuel-soluble cyclopentadienyl manganese tricarbonyl compound in proportions effective to reduce the amount of soot loading in the crankcase lubricating oil to below the amount of soot loading in said crankcase lubricating oil when said vehicle is operated in the same manner and on the same spark-ignition fuel except that the fuel is devoid of a fuel-soluble cyclopentadienyl manganese tricarbonyl compound.

16. The method of claim 14 wherein the spark-ignition fuel comprises gasoline.

17. The method of claim 14 wherein the spark-ignition fuel comprises a blend of hydrocarbons of the gasoline boiling range and a fuel-soluble oxygenated compound.

18. The method of claim 14 wherein said cyclopentadienyl manganese tricarbonyl compound comprises at least one member selected from the group consisting of cyclopentadienyl manganese tricarbonyl, methylcyclopentadienyl manganese tricarbonyl and mixtures thereof.

19. The method of claim 14 wherein the fuel-soluble cyclopentadienyl manganese tricarbonyl compound is present in an amount sufficient to provide 0.0078 to 0.25 gram of manganese per gallon of fuel.

20. The method of claim 19 wherein the fuel-soluble cyclopentadienyl manganese tricarbonyl compound is present in an amount sufficient to provide 0.0156 to 0.125 gram of manganese per gallon of fuel.

21. The method of claim 14 wherein the fuel composition further comprises at least one amine detergent.

22. The method of claim 21 wherein the amine detergent comprises at least one member selected from the group consisting of hydrocarbyl-substituted succinic anhydride derivatives, Mannich condensation products, hydrocarbyl amines and polyetheramines.

23. The method of claim 22 wherein the hydrocarbyl-substituted succinic anhydride derivatives comprise at least one member selected from the group consisting of hydrocarbyl succinimides, hydrocarbyl succinamides, hydrocarbyl succinimide-amides and hydrocarbyl succinimide-esters.

24. The method of claim 14 wherein the fuel composition further comprises a carrier fluid selected from the group consisting of 1) a mineral oil or a blend of mineral oils that have a viscosity index of less than about 120, 2) one or more poly-a-olefin oligomers, 3) one or more poly (oxyalkylene) compounds having an average molecular weight in the range of about 500 to about 3000, 4) one or more polyalkenes, 5) one or more polyalkyl-substituted hydroxyaromatic compounds and 6) mixtures thereof.

25. The method of claim 24 wherein the carrier fluid comprises at least one poly (oxyalkylene) compound.

26. The method of claim 14 wherein the fuel composition further comprises at least one additive selected from the group consisting of antioxidants, carrier fluids, metal deactivators, dyes, markers, corrosion inhibitors, biocides, antistatic additives, drag reducing agents, demulsifiers, dehazers, anti-icing additives, antiknock additives, anti-valve-seat recession additives, lubricity additives and combustion improvers.

* * * * *